Sept. 15, 1931.                B. H. ANIBAL                1,823,420
ENGINE REAR SUPPORT
Filed July 27, 1927
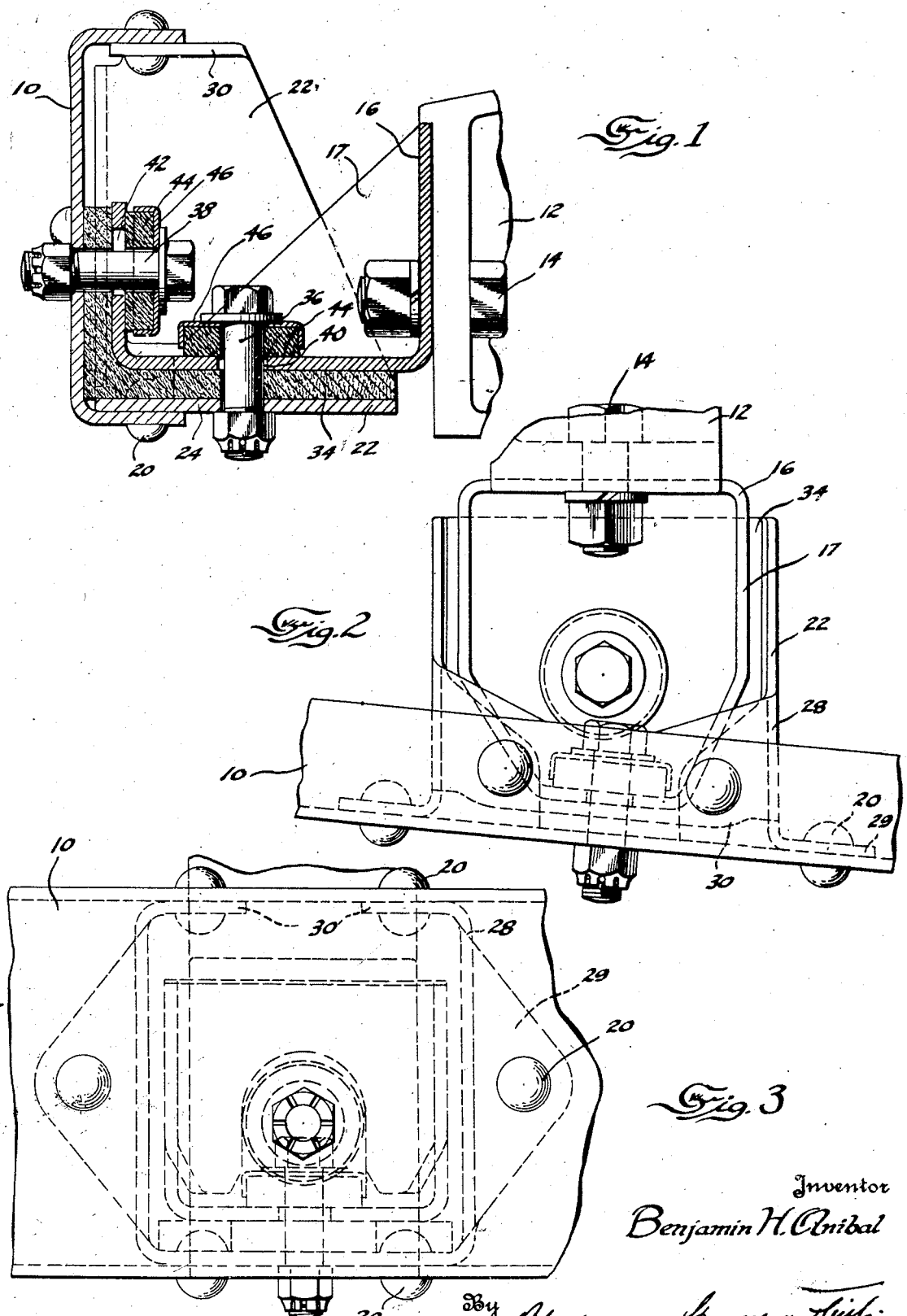
Inventor
Benjamin H. Anibal
By Blackmore, Spencer & Hulse
Attorneys Patented Sept. 15, 1931

1,823,420

UNITED STATES PATENT OFFICE

BENJAMIN H. ANIBAL, OF PONTIAC, MICHIGAN, ASSIGNOR TO GENERAL MOTORS CORPORATION, OF DETROIT, MICHIGAN, A CORPORATION OF DELAWARE

ENGINE REAR SUPPORT

Application filed July 27, 1927. Serial No. 208,887.

This invention relates to a cushioned supporting means.

It is an object of this invention to provide a cushioned connection between two parts of an automotive vehicle, such as between the supporting arm of the engine and the frame. Another object is to provide a simple connection of this type which is strong and durable and which entirely eliminates metallic contact between the engine and frame, thus avoiding the transmission of vibration from the engine to the frame.

Other objects of the invention will appear in the course of the following description, taken in connection with the accompanying drawings and appended claims.

In the drawings—

Figure 1 is a view, mainly in cross section, showing my supporting means arranged between the engine and frame of an automotive vehicle.

Figure 2 is a plan view of the construction shown in Figure 1.

Figure 3 is a side elevation of the construction shown in Figures 1 and 2.

Referring to the drawings, the numeral 10 indicates the frame of an automotive vehicle and the numeral 12 the rear corner of the engine. Rigidly connected to the engine by means of the bolt 14 is the connecting arm 16. This arm is U-shaped in section as shown in Fig. 1 and is provided with side flanges 17. Rigidly fixed within the channel-shaped frame member 10 by means of rivets 20 is the supporting bracket indicated generally at 22. This supporting bracket is formed of a single piece of sheet metal, bent to form a base 24 with two side portions 28 each of which is provided with a bent out part 29 for riveting to the web of the frame, and two inwardly turned upper portions 30 riveted to the upper flange of the frame 10.

Between the bracket 22 and arm 16 of the engine is the L-shaped strip 34 of cushioning material, such as rubber. The arm 16 is connected to the frame 10 by means of bolts 36 and 38. The apertures in the horizontal portion 24 of the bracket and the web of the frame are just large enough to fit snugly over the respective bolts 36 and 38. The corresponding apertures 40 and 42 in the horizontal and vertical flanges of the arm 16, however, are sufficiently larger than their respective bolts to allow a limited amount of movement of the arm 16 with respect to the frame. Surrounding the bolts 36 and 38 are the thick cushioning washers 44 of material similar to that of the cushion 34 and fitting over each washer 44 is a cup-shaped metallic washer 46. Some clearance is provided between the surface of the arm 16 and the rim of each metallic washer 46 to allow for a small amount of vertical and lateral movement.

I thus provide an entirely non-metallic connection between the engine supporting arm and the frame. It will be understood that the connection between each side of the engine and its respective frame member is the same. The connection described in detail in the present case is one of the rear connections of a three-point suspension, any suitable connection for the front end of the engine being used.

I claim:

1. In combination with a supporting member having a pair of angularly related surfaces, a member supported by said supporting member and provided with surfaces adjacent the surfaces of the supporting member and substantially parallel thereto, an L-shaped strip of cushioning material having a leg positioned between each pair of parallel surfaces and in continuous contact with the pairs of angularly related surfaces, aligned openings extending through each pair of parallel surfaces, and securing means of smaller diameter than the opening through one of each pair of parallel surfaces extending through each pair of aligned openings.

2. In combination with a supporting member having a pair of angularly related surfaces, a member supported by said supporting member and provided with surfaces adjacent the surfaces of the supporting member and substantially parallel thereto, an L-shaped strip of cushioning material having a leg positioned between each pair of parallel surfaces and in continuous contact with the pairs of angularly related surfaces, aligned openings extending through each pair of parallel surfaces, headed securing means of smaller diameter than the opening through one of each pair of parallel surfaces extending through each pair of aligned openings, and cushioning means between the head of each securing means and the surface of the adjacent member.

3. In combination, a channel-shaped supporting member, a channel-shaped bracket secured to the flanges and web of said supporting member, a member supported by said supporting member and including a portion extending into the channel of said bracket and the channel of said supporting member, and cushioning means between said portion and the web of the supporting member and between said portion and the web of the bracket.

4. The invention claimed in claim 3 in which the cushioning means is in the form of an L-shaped strip.

5. In combination, a channel-shaped supporting member, a channel-shaped bracket secured to the flanges and web of said supporting member, a member supported by said supporting member, a channel-shaped bracket extending into the channel of the first-mentioned bracket and having a flange secured to said supported member, cushioning means between the other flange of the second-mentioned bracket and the web of the supporting member and between the web of the second-mentioned bracket and the web of the first-mentioned bracket.

6. In combination, a channel-shaped supporting member, a channel-shaped bracket secured to the flanges and web of said supporting member, a member supported by said supporting member, a channel-shaped bracket extending into the channel of the first-mentioned bracket and having a flange secured to said supported member, cushioning means between the other flange of the second-mentioned bracket and web of the supporting member and between the web of the second-mentioned bracket and the web of the first-mentioned bracket, aligned openings extending through the web of the supporting member and the adjacent flange of the second-mentioned bracket, aligned openings extending through the web of the first-mentioned bracket and the web of the second-mentioned bracket, and securing means of smaller diameter than one of each pair of aligned openings extending through each pair of openings.

7. The invention claimed in claim 6 in which each of said securing means is provided with a head on one end thereof, and cushioning means under the head of each of the securing means.

8. A mounting of the class described comprising, a channel shaped frame member, an internal combustion engine having an outwardly extending arm, means for forming a connection between said arm and said frame member, and a resilient pad in continuous contact with two adjacent sides of said frame member, between said frame member and said arm.

In testimony whereof I affix my signature.

BENJAMIN H. ANIBAL.